United States Patent Office 3,427,349
Patented Feb. 11, 1969

3,427,349
1-HYDROXYPERFLUOROCYCLO ALKYL ACETIC ACID AND CORRESPONDING CHLORIDES
Alson K. Price, Mine Hill, and Richard F. Sweeney, Randolph Township, Morris County, N.J., assignors to Allied Chemical Corporation, New York, N.Y., a corporation of New York
No Drawing. Filed Feb. 9, 1966, Ser. No. 526,023
U.S. Cl. 260—514                                    9 Claims
Int. Cl. C07c *61/32;* A61k *27/00*

This invention relates to novel fluorinated acids and more particularly to (1-hydroxyperfluorocycloalkyl)acetic acids containing 6–8 carbon atoms having the formula:

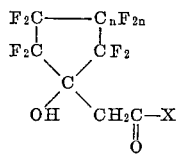

wherein X may be OH or Cl and $n$ may be 0–2.

The above formula encompasses three species of acids, viz (1-hydroxyhexafluorocyclobutyl)acetic acid, (1-hydroxyoctafluorocyclopentyl)acetic acid and (1-hydroxydecafluorocyclohexyl)acetic acid, together with their corresponding chlorides.

The acids are normally colorless crystalline solid materials, solutions of which are useful as oleophobic agents. In addition to the common utility of the three species, (1-hydroxydecafluorocyclohexyl)acetic acid has nematocidal properties which are not possessed by the other two. The corresponding acid chlorides are normally colorless liquids and have utility as sealing adjuvants for films of polymers, terpolymers and copolymers of trifluorochloroethylene. The acid chlorides are also valuable intermediates in the preparation of a wide variety of chemical compounds.

Synthesis of the novel fluorinated acids may be effected by reacting the appropriate perfluorocycloalkanone with malonic acid in the presence of a tertiary amine solvent, such as pyridine.

A 1:1 stoichiometric ratio of malonic acid to perfluorocycloalkanone is required in order to completely utilize the reactants; however, it has been found that yields are improved if an excess of malonic acid is employed. Use of large excesses of malonic acid will not deleteriously affect the reaction. For reasons of economics, the molar ratio of malonic acid to ketone should not exceed about 2:1. The preferred molar ratio of malonic acid to ketone is in the range of about 1.2–1.5:1.

The quantity of solvent present is not critical, however, enough should be present so as to facilitate good mixing of the ketone and malonic acid reactants.

Reaction temperatures are not critical and reaction may be carried out over a relatively wide range. The reaction between ketone and malonic acid is somewhat exothermic and no external heating is required to initiate the reaction. Since the ketone starting materials have relatively low boiling points (perfluorocyclobutanone, B.P. 0–1° C.; perfluorocyclopentanone, B.P. 22–24° C.; perfluorocyclohexanone, B.P. 54° C.), reaction temperatures at the outset should be relatively low or below the boiling point of the ketone employed in order to avoid undue loss of the ketone. Generally, temperatures between about 10–25° C. during the ketone addition are substantially satisfactory. For reasons apparent from the above discussion, a closed system or one under pressure is advantageous particularly when working with the low boiling perfluorocyclobutanone material (B.P. 0–1° C.). After addition of the ketone, the reaction may be conveniently and efficiently carried out even above ambient temperatures. Elevated temperatures may serve to increase reaction rates; however, care must be taken that temperatures do not rise to a point beyond which dissociation and cleavage, particularly of the ketone starting materials, takes place. Normally temperatures should be not be permitted to exceed the reflux temperature of the pyridine solvent (about 115° C.).

The reaction proceeds efficiently at atmospheric pressure but sub- or superatmospheric pressures may be employed. With the possible exception of working with perfluorocyclobutanone, for the reasons discussed above, there is ordinarily no net advantage to be gained by operating at elevated pressures to achieve higher reaction rates when such advantage is weighed against the disadvantages of increased installation and maintenance requirements for such an operation.

For best results the reaction mixture should be stirred during contacting of the reactants.

Product recovery involves no more than the application of conventional recovery and purification techniques known to the art for recovery of solid crystalline materials from solutions of this type. The fluorinated acids of the invention are salts in the nitrogenous base solution and the first step is normally to acidify the solution in order to reconvert the products to their acid form and to convert pyridine to its protonated form. This may be accomplished by diluting the reaction mixture with water and acidifying the dilute solution with conc. HCl. The acidified solution can then be extracted with ethyl ether to remove the sought-for product in the organic (ether) layer, leaving the pyridinium salt in the aqueous layer. The organic layer can then be washed with water to remove any further traces of pyridinium salt and then the water removed, such as by drying over sodium sulfate. The ethyl ether extractant can then be separated from the product by diluting with petroleum ether and evaporating. The state of purity of the product at this point is about 90–95%. If desired, further purification may be effected by recrystallization from a non-polar solvent, such as benzene or preferably a halogenated hydrocarbon, e.g., $CCl_4$ or $CHCl_3$.

The corresponding acid chlorides may be prepared by conventional reaction of the acid with thionyl chloride. At least an equimolar amount of the thionyl chloride reactant should be employed and the reaction proceeds best in the presence of a suitable catalyst, such as pyridine, and at somewhat elevated temperatures, say in the range of about 40–80° C.

In the following examples, parts and percentages are by weight unless otherwise indicated.

EXAMPLE 1

A two liter, three-necked flask, equipped with a stirrer, thermometer, dropping funnel and reflux condenser, which in turn was connected to a drying tube, was charged with 180 ml. of pyridine and 93.5 g. (0.90 mole) of malonic acid. To this mixture were added, dropwise and with stirring, 147 g. (0.64 mole) of prefluorocyclopentanone, while the temperature was maintained at about 10–25° C. by means of an ice-water bath. After completion of the addition of the ketone reactant, stirring of the reaction mixture was continued for approximately 18 hours at ambient temperatures. At the end of this period the resulting mixture was diluted with 900 ml. of water and the solution was acidified with 192 ml. of conc. HCl. The acidified solution was then extracted with five 200 ml. portions of ethyl ether. The organic layers from the extractions were combined, washed with 150 ml. of water and dried over sodium sulfate. After dilution with petroleum ether, the ethyl ether and petroleum ether were removed by a rotary evaporator. The product consisted of a yellowish crystalline material. Recrystallization of this material from $CCl_4$ gave 163 g. (89% yield of (1-hydroxyoctafluorocyclopentyl)acetic acid (M.P. 116–118° C.). A portion of this product was recrystallized twice more from CCl₄ to provide an analytical sample comprising essentially colorless crystals possessing a melting point of 117–119° C.

*Analysis.*—Calculated for $C_7H_4O_3F_8$: C, 29.2%; H, 1.4%; F, 52.8%. Found: C, 30.18%; H, 1.87%; F, 53.18%.

The infrared spectrum of this material exhibits bands at about 2.8, 3.3 and 5.83 microns, corresponding to the hydroxyl and acid functions and thus confirms the identity of the expected structure.

EXAMPLE 2

The procedure followed was essentially the same as that described in Example 1. A total of 100 g. (0.36 mole) of perfluorocyclohexanone was reacted with 83.2 g. (0.8 mole) of malonic acid in the presence of 240 ml. of pyridine. When the reaction was complete, the product mixture was diluted with 1,200 ml. of water, acidified with 256 ml. of conc. HCl and extracted with five 300 ml. portions of ethyl ether. The organic extracts were combined, washed with 200 ml. of water and dried over sodium sulfate. Ethyl ether solvent was then removed with a rotary evaporator, leaving 110 g. of crude product. The crude product was recrystallized from CCl₄ giving 91 g. (83% yield) of essentially colorless crystals of (1-hydroxydecafluorocyclohexyl)acetic acid (M.P. 122–125° C.).

*Analysis.*—Calculated for $C_8H_4O_3F_{10}$: C. 28.4%; H, 1.18%; F, 56.2%. Found: C, 28.22%; H, 1.16%; F, 56.07%.

The infrared spectrum of this material exhibits bands at approximately 2.9, 3.3 and 5.86 microns, which are characteristic of the hydroxyl and acid functions, thus confirming the identity of the expected structure.

EXAMPLE 3

The procedure is the same as described in Example 2 excepting that a corresponding equimolar amount of perfluorocyclobutanone is reacted with the malonic acid in the presence of the pyridine catalyst and reaction temperatures are maintained substantially in the range of about 10–15° C. The product recovered is (1-hydroxyhexafluorocyclobutyl)acetic acid.

EXAMPLE 4

A mixture of 15.3 g. (0.05 mole) of (1-hydroxyperfluorocyclopentyl)acetic acid, 10.7 g. (0.09 mole) of thionyl chloride and 4 drops of pyridine was heated at 60° C. for a period of five hours. The reaction mixture was then heated to 75° C. and maintained at that level for an additional 6 hours. Gas chromatographic analysis showed that approximately 75% of the mixture consisted of (1-hydroxyoctafluorocyclopentyl)acetyl chloride.

*Analysis.*—Calculated for $C_7H_3ClO_2F_8$: H, 0.98%; F, 49.7%. Found: H, 0.95%; F, 50.7%.

The infrared spectrum of the product, which was a colorless liquid, showed strong absorption bands at about 2.85 and 5.65 microns, corresponding to the hydroxyl and acid chloride functions respectively, thus confirming identification of the acid chloride product.

EXAMPLE 5

A mixture of 13.4 g. (0.0398 mole) of (1-hydroxyperfluorocyclohexyl)acetic acid, 8.3 g. (0.07 mole) of thionyl chloride and 4 drops of pyridine was heated at 60° C. for a period of five hours. The reaction mixture was then heated to 75° C. and maintained at that level for an additional 6 hours. Gas chromatographic analysis showed that approximately 81% of the mixture consisted of (1-hydroxydecafluorocyclohexyl)acetyl chloride. The infrared spectrum of the product, which was a colorless liquid, showed strong absorption bands at about 2.83 and 5.62 microns, corresponding to the hydroxyl and acid chloride functions respectively, thus confirming identification of the acid chloride product.

EXAMPLE 6

The procedure followed was the same as described in Example 5 excepting that a corresponding equimolar amount of (1-hydroxyhexafluorocyclobutyl)acetic acid is reacted with the thionyl chloride in the presence of the pyridine catalyst. The product obtained is the corresponding (1-hydroxyhexafluorocyclobutyl)acetyl chloride.

EXAMPLE 7

The measurement of the contact angles formed by drops of liquid with surfaces on which they are placed provides an indication of the degree of wetting that occurs on such surfaces. The size of the contact angle which results will vary directly with the repellency of the surface. Thus, higher contact angles are obtained in the case of more repellent surfaces. This procedure was used to test the oleophobicity of the (1-hydroxyperfluorocycloalkyl)acetic acids of the invention.

A drop of Nujol was found to form a contact angle of 59° when placed on a glass slide which had been treated with an acetone solution of (1-hydroxydecafluorocyclohexyl)acetic acid. A drop of Nujol placed on an untreated slide formed a contact angle of only 25.5°. A drop of Nujol placed on a slide which had been treated only with acetone formed a contact angle of 34°.

When other (1-hydroxyperfluorocycloalkyl)acetic acids of the invention are employed in the above described test for oleophobicity, it is found that substantially the same results are obtained, i.e., drops of Nujol form much larger contact angles with glass slides which are treated with solutions of the (1-hydroxyperfluorocycloalkyl)acetic acids, as compared with slides which are not so treated.

EXAMPLE 8

(1-hydroxydecafluorocyclohexyl)acetyl chloride was tested as sealing adjuvant for thermoplastic film composed of a copolymer of about 96% trifluorochloroethylene and about 4% vinylidene fluoride. A pair of polymer film strips was sealed together without the use of sealing adjuvant. Another pair of polymer film strips was sealed together this time employing as sealing adjuvant liquid (1-hydroxydecafluorocyclohexyl)acetyl chloride. The sealing adjuvant was applied by merely coating, as by brushing, the inner surfaces of the film strips to be sealed. An impulse heat sealer was used. The impulse heat sealer was a Sentinel Impulse Sealer manufactured by Packaging Industries, Inc. of Montclair, N.J. The sealing pressure was 30 p.s.i.a. The heat sealing temperature was 375° F. Dwell time for the seal, or in other words, the length of time during which the pressure and heat were applied to effect the seal, was three (3) seconds. The sealing adjuvant not only formed a strong seal between the polymer film strips but, additionally, strengthened the polymer film in the vicinity of the seal, for when it was attempted to test the seal strength by measuring the amount of force needed to rupture or pull apart the seal, it was found that the polymer film ruptured before the seal, at a point away from the sealing area. As can be seen from the following table, the polymer film pair sealed with the sealing adjuvant, ruptured at weight considerably higher than the film pair which was not so treated.

Table I

| | Wgt. to effect rupture, g. |
|---|---|
| Film strips heat-sealed without use of adjuvants | <9 |
| Film strips heat-sealed with (1-hydroxydecafluorocyclohexyl)acetyl chloride | >660 |

When the other (1-hydroxyperfluorocycloalkyl)acetyl chloride species within the scope of the invention are employed as sealing adjuvants for such polymer film strips, as described above, substantially equivalent results are obtained, i.e., film strips heat-sealed using such materials as sealing adjuvants rupture at weights considerably higher than film strips heat-sealed without the use of sealing adjuvant.

Although a copolymer of about 96% trifluorochloroethylene and about 4% vinylidene fluoride was employed, a wide variety of polymers, terpolymers and copolymers of trifluorochloroethylene may be employed, also with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight trifluorochloroethylene. The general class of compositions described above can be referred to generically as polytrifluorochloroethylene.

We claim:
1. Compounds of the formula:

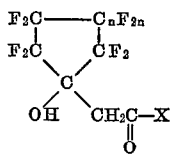

wherein X may be OH or Cl and $n$ is 0-2.

2. Compounds according to claim 1 wherein X is OH.
3. Compounds according to claim 1 wherein X is Cl.
4. A compound according to claim 1 which is (1-hydroxyhexafluorocyclobutyl)acetic acid.
5. A compound according to claim 1 which is (1-hydroxyoctafluorocyclopentyl)acetic acid.
6. A compound according to claim 1 which is (1-hydroxydecafluorocyclohexyl)acetic acid.
7. A compound according to claim 1 which is (1-hydroxyhexafluorocyclobutyl)acetyl chloride.
8. A compound according to claim 1 which is (1-hydroxyoctafluorocyclopentyl)acetyl chloride.
9. A compound according to claim 1 which is (1-hydroxydecafluorocyclohexyl)acetyl chloride.

References Cited

McBee et al.: JACS 77, 1581-3, 1955.

JAMES A. PATTEN, *Primary Examiner.*

P. J. KILLOS, *Assistant Examiner.*

U.S. Cl. X.R.

106—2; 260—544, 29.1, 29.6, 31.2, 999